United States Patent [19]
Nauman et al.

[11] Patent Number: 5,190,306
[45] Date of Patent: Mar. 2, 1993

[54] PASSENGER TRANSPORTATION SYSTEM FOR BICYCLES

[76] Inventors: Leonard G. Nauman, 1020 Quebec Ave. North, Golden Valley, Minn. 55427; Dale E. Stenberg, 10336 Wentworth Ave. South, Bloomington, Minn. 55420

[21] Appl. No.: 830,183

[22] Filed: Jan. 31, 1992

Related U.S. Application Data

[63] Continuation of Ser. No. 587,801, Sep. 25, 1990, abandoned, which is a continuation-in-part of Ser. No. 457,371, Dec. 27, 1989, Pat. No. 5,052,704.

[51] Int. Cl.$^5$ ............................................... B62J 1/00
[52] U.S. Cl. ..................... 280/202; 224/159; 224/160; 280/273; 280/291; 297/243
[58] Field of Search ............ 280/202, 273, 291, 288.4, 280/33.993, 727; 296/75

[56] References Cited

U.S. PATENT DOCUMENTS

| | | | |
|---|---|---|---|
| 555,576 | 3/1896 | Logan | 296/75 |
| 585,963 | 7/1897 | Mercier | 280/291 |
| 588,873 | 8/1897 | Nisbet | 280/291 |
| 593,678 | 11/1897 | Neider | 280/291 |
| 2,517,957 | 8/1950 | Anderson | 280/291 |
| 4,149,687 | 4/1979 | Nunemacher | 224/159 |
| 4,226,347 | 10/1980 | Rice | 224/35 |
| 4,560,097 | 12/1985 | Reynolds et al. | 224/160 |
| 4,632,453 | 12/1986 | Robbin et al. | 280/291 |
| 4,771,651 | 9/1988 | Haro | 280/291 |
| 4,969,658 | 11/1990 | Levarek et al. | 280/202 |
| 4,973,074 | 11/1990 | Robinson | 280/287 |
| 5,052,704 | 10/1991 | Nauman | 280/202 |

FOREIGN PATENT DOCUMENTS

| | | | |
|---|---|---|---|
| 128410 | 5/1947 | Australia | 280/202 |
| 106070 | 4/1927 | Austria | 280/202 |
| 216095 | 11/1941 | Switzerland | 280/202 |
| 239666 | 2/1946 | Switzerland | 280/202 |
| 16734 | of 1897 | United Kingdom | 280/291 |
| 20672 | of 1913 | United Kingdom | 280/291 |

*Primary Examiner*—Mitchell J. Hill
*Attorney, Agent, or Firm*—Moore & Hansen

[57] ABSTRACT

The present invention provides a bicycle passenger transportation system including an auxiliary seat for mounting on the horizontal bar of the bicycle forwardly of the rider's seat, a passenger footrest and a supporting harness extending between the passenger and the rider.

35 Claims, 2 Drawing Sheets

PASSENGER TRANSPORTATION SYSTEM FOR BICYCLES

This is a continuation application of continuation-in-part application Ser. No. 07/587,801, filed Sep. 25, 1990 now abandoned, which was a continuation-in-part of co-pending application Ser. No. 07/457,371, filed on Dec. 27, 1989 and entitled AUXILIARY SEAT FOR BICYCLES, which has issued as U.S. Pat. No. 5,052,704 to Nauman issued Oct. 1, 1991.

BACKGROUND OF THE INVENTION

This invention relates to a passenger transportation system for bicycles in general and in particular to such a system including a seat for safely and comfortably supporting a child as a passenger on the bicycle, a footrest for safely and comfortably supporting the passenger's feet, and to a safety belt system for securing and restraining the passenger in a safe, comfortable and effective way on the bicycle.

The prior art demonstrates that a system for safely transporting a rider and a passenger on a bicycle has long been sought. In particular, a need exists for a transportation system for comfortably and safely seating a young child on a bicycle with his rider parent. The prior art shows many such systems that are limited to seats for mounting on a bicycle both in front of and behind the main seat. All of these systems suffer from various shortcomings. Primarily, they are not readily and easily attachable to the bicycle and just as easily removable. Thus, a parent who wishes to bicycle-ride solo must either carry the seat with him or spend time removing the seat and then later installing it when taking the child for a ride. A further deficiency of prior art systems is that no footrest is provided for the child passenger. This puts the child in the uncomfortable position of simply dangling his feet on either side of the horizontal bar. This position is dangerous as well as uncomfortable for several reasons. First of all, it is possible for the child's foot to become caught in the spokes of the front wheel of the bicycle leading to foot injuries. In addition, should the child's foot become entangled in the spokes, the entanglement itself may cause the bicycle to spill, thereby potentially leading to greater injuries to the child, injuries to the adult rider, injuries to other riders or pedestrians near the bicycle spill, and damage to the bicycle itself.

As noted, auxiliary seats for carrying bicycle passengers are well known, the most common of which are those which are supported on the rear fender of the bicycle behind the main seat. Such seats have a number of disadvantages. The major problem is that the child is seated behind the adult, thus making it impossible for the adult riding on the main seat of the bicycle to maintain visual contact with the child for safety reasons. Because of the rearward disposition of such seats behind the main bicycle seat, the momentum generated when negotiating turns creates a tendency to throw the child sideways off of the rearwardly disposed seat. Also, the child's view is blocked by the adult, thus significantly detracting from the riding experience on the part of the child passenger. Such fender-mounted seats also require special hardware and fasteners by means of which they are permanently attached to the bicycle rear fender or frame.

Auxiliary seats which are mounted forwardly of the main seat on bicycles are also known. However, most of those seats are duplicates of the standard bicycle seat and are mounted by special brackets and hardware requiring the use of fasteners and tools. U.S. Pat. Nos. 2,550,200 (Murrell), 2,448,867 (Darden), 2,234,299 (Christy), and 579,514 (Collins) all are in that general category.

U.S. Pat. No. 4,305,532 issued to John F. Reminger discloses a carrier for mounting on the horizontal bar of a man's bicycle, forwardly of the main seat. The embodiment shown in FIG. 11 of the Reminger patent is mounted on the horizontal bar of the bicycle by means of two downwardly depending gripping arms; however, special, resilient tension members in the form of supporting wires are hooked to the side walls of the carrier, and are required to secure the carrier in place on the bicycle frame.

U.S. Pat. No. 4,632,453 issued to John D. Robbin et al also discloses an auxiliary seat mounted on the horizontal bar of a man's bicycle, forwardly of the main seat. However, the auxiliary seat is of the same structure and configuration as a standard bicycle seat, and is supported on a post. The post is secured to the horizontal bar of the bicycle by means of a two-piece tubular assembly which is secured around the horizontal bar by means of hose clamps.

Various safety belt systems for securing passengers in and on vehicles are known. However, there are no known safety belt systems, to my knowledge, which are particularly adapted for securing a passenger, such as a child, in front of an adult seated on a main vehicle seat. The safety belt system disclosed herein has been developed with such a purpose in mind, i.e., to accommodate and secure a passenger, on an auxiliary seat constructed and arranged to be supported in front of the main seat of a bicycle. The belt system of this invention has been developed with a view towards accommodating such a dual passenger seating arrangement, with a belt provided for the adult and secured to an adult passenger serving as an attachment means for a safety belt secured around a child seated immediately in front of the adult.

Thus, a need exists for a bicycle footrest to prevent injuries. Such a footrest should be easily attachable, safe to use, non-damaging to pedestrians or riders the bicycle may pass, and light weight. Furthermore, there exists a need for an auxiliary seat which may be quickly and easily mounted on the horizontal bar of a bicycle, forwardly of the main seat, and which will comfortably and safely support passengers. There also exists a need for a harness to secure a passenger, most often a child, to the adult rider on the main bicycle seat. A complete bicycle transportation system comprising a footrest, seat and harness then, should be readily attachable and removable from the bicycle, safe, and support the child rider while providing a safe, fun and visually exciting ride.

BRIEF SUMMARY OF THE INVENTION

The present invention provides a bicycle passenger transportation system useful on a bicycle. The present invention includes an auxiliary seat mountable on the horizontal bar of a bicycle; a two-part harness extending between the rider positioned on the main bicycle seat and the passenger; and a footrest mountable to the diagonal bar of the bicycle for providing a resting spot for the passenger's feet, while preventing their entanglement in the spokes of the front wheel.

In particular, the auxiliary bicycle seat of this invention is characterized by a seat structure which can be quickly and easily slipped in place over the horizontal bar of a bicycle between the main seat and the handlebars, and which may be slidably adjusted along the length of that horizontal bar, without the need for any special clamps, hardware, brackets, or tools of any kind for the installation or adjustment of the auxiliary seat.

These basic objectives are realized by forming the auxiliary seat as an elongated, preferably cylindrical cushion having a slot extending lengthwise of the cushion and terminating at its lower end in a continuous opening in the bottom of the cushion which extends through the outer cushion surface. The upper end of the slot is closed and terminates within the body of the seat cushion. The cushion may thus be removably mounted on the horizontal bar of a bicycle between the main seat post and the handlebar by forcing the opening in the bottom of the slot downwardly over the horizontal bar so that the slot slides over the bar, until the closed end of the slot is brought into firm engagement with the horizontal bar. The cushion is made of material which is dense enough to support the weight of a rider, yet is sufficiently resilient that the portions of the cushion along the side walls of the slot spring inwardly towards each other to firmly embrace the ba of the bicycle after the cushion is in place.

As a particularly advantageous feature, the upper end of the aforesaid slot in the seat cushion terminates in a tubular passage which is sized and adapted to fit snugly around the horizontal bar of a bicycle. The tubular passage is preferably of a lesser diameter than the horizontal bicycle bar which it embraces, as a result of which the resilient walls of the tubular passage within the body of the cushion squeeze tightly around the horizontal bar and firmly embrace it so as to hold the auxiliary seat cushion in place.

A further beneficial aspect of the auxiliary seat resides in its uniform, cylindrical shape. With such a shape, a person seated on the cushion will be comfortably supported at any position along the length of the seat cushion, and will not suffer any discomfort if the cushion should rotate slightly on the horizontal bar of the bicycle. Various materials may be utilized to make the auxiliary seat of such a cylindrical shape. Polyurethane foam has been found to be particularly desirable.

The safety belt system of this invention is particularly characterized by its ability to securely and comfortably restrain a passenger, and in particular a child, seated immediately in front of an adult on a vehicle seat.

This basic objective has been realized by providing a first belt or harness adapted to be secured around the shoulders of a rider on a vehicle seat and having coupling means positioned so as to be located on the front side of the rider's body. A second safety belt is constructed and arranged to be worn by a passenger, and most particularly by a child, seated in front of the adult rider. The second belt has complementary coupling means located thereon so as to be positioned on the back side of the passenger's body for detachable, coupling engagement with the aforesaid coupling means on the first belt worn by the rider. In this way, a passenger will be secured to and supported by a rider sitting on the main seat of a vehicle.

The aforesaid belt system has particular application to the restraint and securing of a child passenger on a bicycle. For that purpose, an auxiliary seat is provided which is adapted to be secured to the horizontal bar extending between the main seat post and the horizontal post of a bicycle, at a location forwardly of the main seat. The auxiliary seat is slotted along its length, on the bottom side thereof, for quick and easy, slidable fitting over the aforesaid bicycle horizontal bar. When sitting on such an auxiliary bicycle seat, immediately in front of an adult riding on the main seat, the aforesaid complementary coupling means on the child's safety belt may be quickly, detachably engaged with the coupling means on the adult's belt.

Advantageously, the first or adult belt is comprised of a pair of opposed, looped shoulder straps through which the adult rider's arms extend and which are adapted to fit around the rider's shoulders. A neck strap extends between the two looped shoulder straps and is adapted to lie across the top of the rider's shoulders. In this way, any load imposed by the transmission of forces from the second belt secured to the child passenger will be comfortably and effectively borne by the shoulders of the adult rider.

As a further beneficial feature, effective and convenient detachable engagement of the coupling members on the two belts is provided by utilizing a pair of coupling members on a pair of shoulder straps of the second passenger belt so that they can be slidably positioned for engagement with a pair of coupling members secured to shoulder straps on the first rider's belt on the front side of the torso of the rider.

The passenger footrest provided by the present invention includes first and second sides connected to each other along a longitudinally extending vertex. The footrest includes at least one foot land on each side for resting a foot thereon. The footrest is mountable to the bicycle diagonal bar below the auxiliary seat such that the bar is nested within the longitudinally extending vertex and such that the two sides depend downwardly from the vertex.

These and other objects and advantages of the invention will become readily apparent as the following description is read in conjunction with the accompanying drawings wherein like reference numerals have been used to designate like elements throughout the several views.

DESCRIPTION OF THE PREFERRED EMBODIMENT

Figures 1, 2, 3, 4:
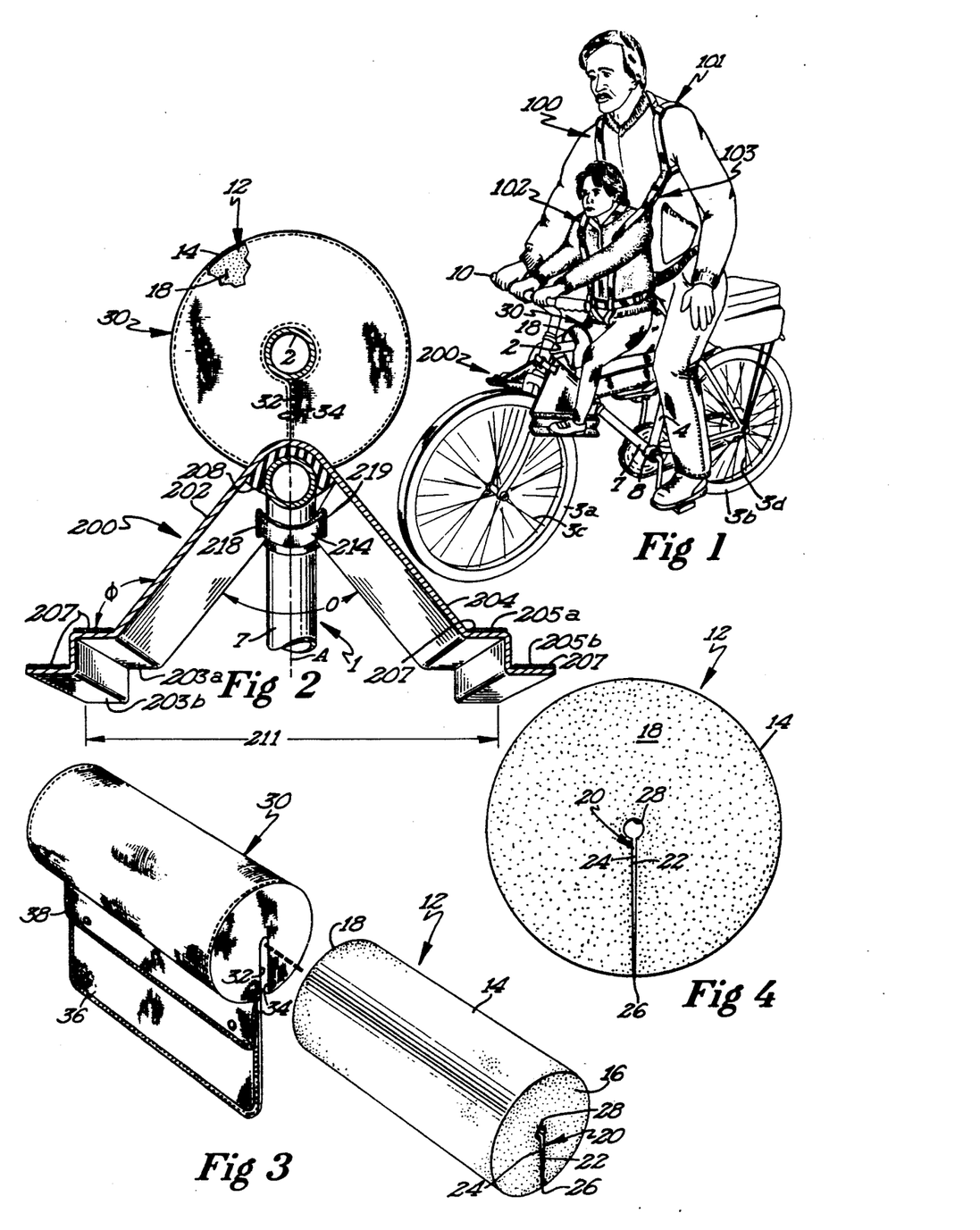
FIG. 1 is a perspective view of a bicycle with the improved passenger transportation system of the present invention mounted on it.
FIG. 2 is an endview of the bicycle of FIG. 1 taken along lines 2—2 showing the auxiliary seat of FIG. 1 in the condition if assumes when mounted on the horizontal bar of a bicycle, and the footrest of the present invention.
FIG. 3 is a perspective view of the auxiliary seat showing the seat cover removed, in exploded relation to the seat cushion.
FIG. 4 is an end view of the auxiliary seat in its normal position of nonuse.

With reference to the drawings, FIG. 1 generally indicates a bicycle 1 of standard construction on which the auxiliary seat is adapted to be mounted. Such a bicycle is of the man's type having a horizontal bar 2 upon which the auxiliary seat of the present invention is mounted. Bicycle 1 includes front and rear wheels 3a and 3b respectively and a plurality of supporting spokes 3c and 3d respectively. Horizontal bar 2 extends between an upright seat post 4 and a forwardly located handlebar support post 6. Although reference is made to a man's bicycle, it is anticipated that a woman's bicycle could be adapted for use of the auxiliary seat disclosed herein, by the mounting of a special, removable horizontal bar between the rear seat post 4 and the handlebar post 6. Bicycle 1 further includes a diagonal bar 7 extending between handlebar post 6 and a pedal bearing housing 8, where seat post 4 also is carried. A main seat 9 is mounted on top of the upright seat post 4, and a handlebar assembly 10 is supported on post 6.

The auxiliary seat is generally indicated by reference numeral 12. The seat is preferably formed in the shape of an elongated, cylindrical body 14 made of material having sufficient density to support the weight of a person. Although various materials may be utilized for forming such a seat, polyurethane foam of at least medium density has been found to be particularly suitable. The cylindrical seat body 14 has opposed end walls 16 and 18.

Extending lengthwise over the entire length of the seat body 14 is an elongated slot 20 defined by opposed side walls 22 and 24. Slot 20 terminates at its lower end in a continuous opening 26 extending through the outer surface of cylindrical body 14. At its upper end, slot 20 is closed, and preferably terminates in a tubular passage 28 as shown most clearly in FIGS. 3 and 4.

As may be noted by reference to all of the figures of the drawings, slot 20 extends substantially vertically when the seat cushion is oriented horizontally for mounting o the horizontal bar of a bicycle, with tubular passage 28 being located substantially along the longitudinal central axis of the seat cushion body 14. Thus, slot 20 extends vertically between continuous opening 26 at the bottom thereof and tubular passage 28 at the upper end of slot 20. Elongated passage 28 is advantageously sized so that it will be of a lesser diameter than the horizontal bar to be found on most men's bicycles. As a result, tubular passage 28 will be stretched radially so as to compress the material of seat body 14 surrounding it, when slot 20 is forced downwardly over the bicycle horizontal bar 2. Thus, after installation on the horizontal bar 2 of the bicycle to the position shown in FIGS. 1, 4, and 5, the resilient material of seat body 14 will spring back inwardly around horizontal bar 2 in secure, embracing engagement therewith. In this way, the auxiliary seat 12 is firmly held in place on the horizontal bar of the bicycle without the need of any special mounting hardware or brackets or special fasteners.

It will thus be seen that auxiliary seat 12 can be quickly and easily mounted on the horizontal bar of a bicycle, forwardly of the main seat by simply positioning seat body 14 on top of the bar with continuous opening 26 of slot 20 aligned longitudinally with the bar. Downward force applied to the seat body 14 will force slot 20 downwardly over the bar 2. As this happens, the side walls 22 and 24 of slot 20 will be spread apart to the position shown in FIG. 4. Side walls 22 and 24 are normally positioned closely adjacent to each other, and preferably slightly tapered upwardly and outwardly as shown in FIG. 3. After slot 20 is pushed downwardly over its full extent so as to bring elongated passage 28 against and around the horizontal bicycle bar 2, side walls 22 and 24 of slot 20 will remain in a slightly outwardly spread condition. However, the gap between side walls 22 and 24 as shown in FIG. 4 will be less than the width or diameter of the bicycle bar 2. As a result, side walls 22 and 24 will be urged inwardly towards each other, as will the material of cushion body 14 defining tubular passage 28. This provides a tight fit of tubular passage 28 around bar 2, which serves to securely hold the auxiliary seat 12 in place. As shown in FIG. 1, cover 30 substantially hides the gap when auxiliary seat 12 is placed on bar 2.

Figures 5, 6, 7:
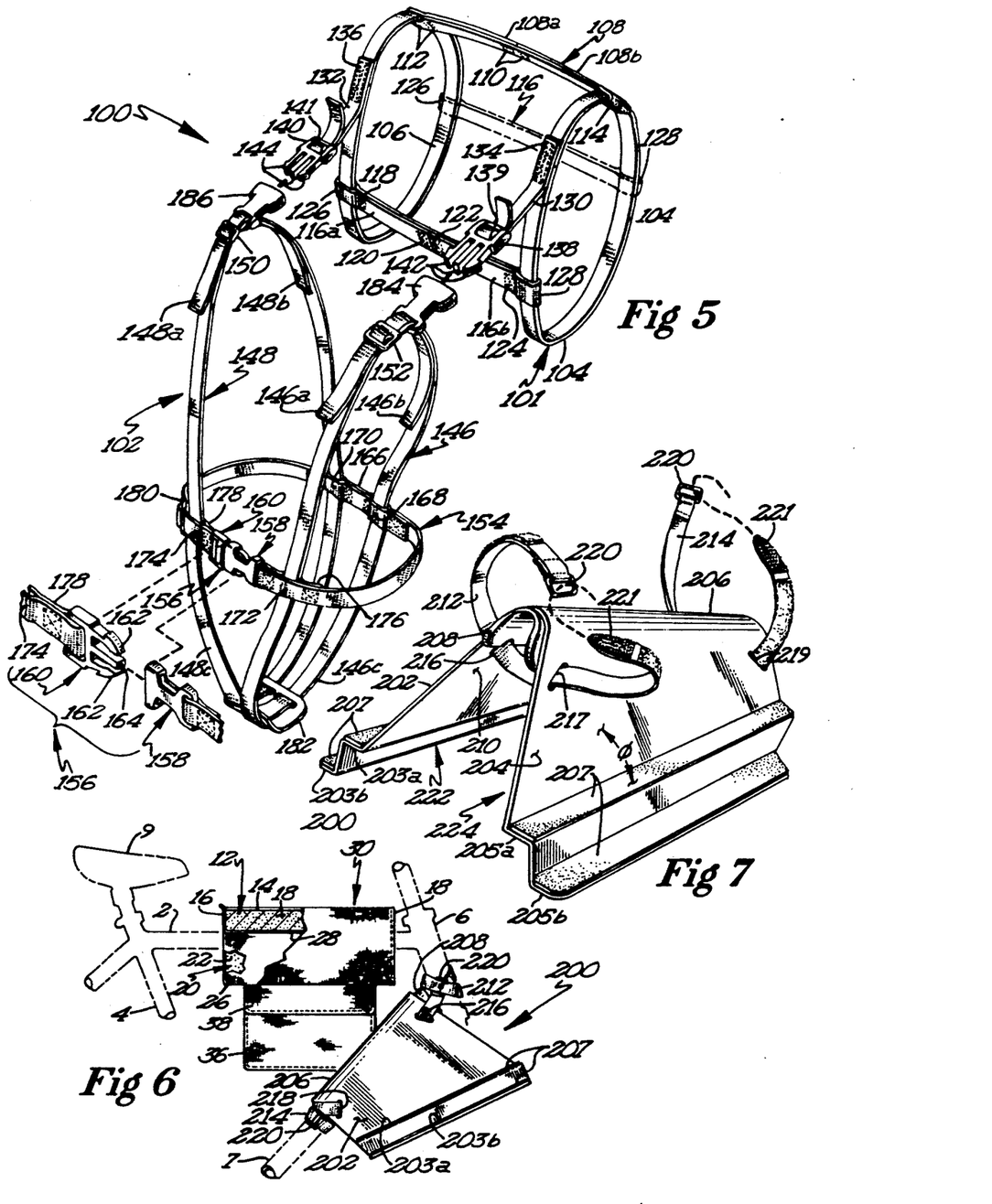
FIG. 5 is a perspective, exploded view of the safety belts of this invention.
FIG. 6 is a side elevation view of a bicycle showing the auxiliary seat and footrest mounted thereon, in vertical section.
FIG. 7 is a perspective, front end view of the footrest.

After removable mounting on the horizontal bar 2 of a bicycle as shown in FIGS. 1 and 5, the auxiliary seat 12 may be readily adjusted along the length of bar 2 by simply sliding it back and forth. Tubular passage 28 facilitates such slidable adjustment. The location of seat 12 on bar 2 may be longitudinally adjusted in such a manner so that the person seated thereon may comfortably grasp the handlebars 10 to hold himself on the bicycle. Also, the uniform, cylindrical shape of seat body 14 permits the passenger to rest comfortably on the auxiliary seat at any location along its length; and even if the seat body 14 should rotate slightly around bicycle bar 2, the uniform geometry of seat body 14 will present a comfortable surface to the passenger.

Although not essential, a cover generally indicated by reference numeral 30 and shown most clearly in FIG. 2 may be provided around seat body 14. Cover 30 may be made of nylon, or of any other suitable, durable material. Cover 30 is preferably made so that it totally covers all of the outer surface of seat body 14, including end walls 16 and 18. Preferably, cover 30 is formed with vertically extending, slot segments 32 and 34 folded upwardly in the center thereof so as to conform to and overlie side walls 22 and 24 of slot 20 in seat body 14. In this way, cover side walls 32 and 34 serve to protect the portions of seat body 14 defining slot side walls 22 and 24 so as to avoid excessive wear on the slot portions of seat body 14 in the course of frequent mounting on and removal from a bicycle bar. FIG. 4 shows cover 30 in phantom as it would be positioned in embracing relation to seat body 14, and extending within slot 20.

Cover 30 may also be formed to include a downwardly depending pocket 36 having a closure flap 38 snapped in place thereon. This permits the carrying of articles on seat cover 30. Although shown depending downwardly directly under slot opening 26, pocket 36 could be formed integrally with cover 30 at any point along the length thereof, around its periphery.

The particular benefits to be derived from the auxiliary seat disclosed herein are readily apparent. The child is seated in front of the adult where he has full visibility, and where the adult can at all times have full visual contact with the child passenger. The adult and the child are comfortably positioned closely adjacent to each other so that they may converse and enjoy a bicycle ride together. The child may adjust himself along the length of removable auxiliary seat 12 so that he may comfortably grasp the handlebars 10, as shown in FIG. 1. The child may also slidably adjust seat 12 along the length of horizontal bicycle bar 2, as may be necessary and appropriate. Auxiliary seat 12 is compact and of light weight, and may be readily slipped onto and off of bicycle bar 2 by way of slot 20 in seat body 14. No special tools are required for that purpose.

Optionally, a restraining and safety belt system 100 may be utilized by the adult rider and the passenger, particularly in th case of a child passenger, to assist in securely holding the passenger on the auxiliary seat 12. Thus, as shown in FIG. 1, the adult rider seated on the main seat 8 may wear a harness type of belt unit 101, and a special harness 102 may be worn by the child. Harnesses 101 and 102 are provided with complementary, mating coupling members whereby they may be quickly and easily secured to each other as indicated at 103 in FIG. 1. In this way, the adult rider supports and secures the child riding in front of him by way of the interlocking harnesses.

With reference to the drawings, FIG. 5 illustrates in greater detail an in exploded, perspective view the seat belt apparatus 100 of this invention shown in FIG. 1. Belt 101 preferably is in the form of a shoulder harness and is comprised of a pair of opposed, looped shoulder straps 104 and 106 through which the rider's arms extend and which are adapted to fit around the rider's shoulders. A neck strap 108 is secured between shoulder straps 104 and 106, and is wrapped around top portions of those straps as shown in FIG. 1. Opposed end segments 108a and 108b of neck strap 108 overlap the main strap, and are secured thereto adjacent to shoulder straps 104 and 106, as by stitching indicated by reference numerals 112 and 114. Strap or harness 101 further includes a strap 116 secured between the rear sides of shoulder straps 104 and 106, and preferably looped therearound as shown so as to be slidably adjustable thereon. End segments 116a and 116b of strap 116 are stitched to the rear side thereof in overlapping relation to the main strap 116 at spaced-apart locations indicated by reference numerals 118, 120, 122, and 124. Stitches 118 and 124 form loops 126 and 128 by means of which strap 116 may be slidably adjusted upwardly and downwardly on shoulder straps 104 and 106 so as to best conform to the back of the wearer in the area of the shoulder blades. The preferred location of strap 116 is indicated in phantom lines in Figures. Attached to the front or chest side of shoulder straps 104 and 106 are a pair of coupling straps 130 and 132, stitching 134 and 136 being preferably utilized to secure coupling straps 130 and 132 at the desired locations on shoulder straps 104 and 106. The free ends of coupling straps 130 and 132 are attached to a pair of coupling members 138 and 140, preferably by simply looping those free ends through buckles 139 and 141 thereon. Coupling members 138 and 140 are commercially available buckle-type couplings, and include forwardly projecting male coupling elements in the form of spaced-apart prongs 142 and 144. Prongs 142 and 144 are adapted to be releasably and detachably received in complementary coupling members 184 and 186 on the second belt 102, as hereinafter set forth.

The second belt 102 has been particularly constructed and designed for use with its primary application to child passengers. Thus, belt 102 takes the form of a harness comprised of a pair of shoulder straps 146 and 148 having opposed end segments 146a, 146b and 148a, 148b, which overlap each other adjacent to slide buckles 150 and 152, through which they are connected as shown in FIG. 5. Straps 146 and 148 may thus be adjusted by means of slide buckles 150 and 152 so as to securely fit around the shoulders of a passenger.

Belt or harness 102 is further comprised of a waist belt 154 adapted to be secured around the waist of a passenger by means of a main belt buckle 156. Buckle 156 is of the same construction as couplings 138, 184 and 140, 186. Thus, belt buckle 156 is comprised of a buckle sleeve 158, which is adapted to receive a buckle insert tongue 160 in releasable, buckling engagement therewith. Buckle tongue 160 is comprised of a plurality of prongs including a pair of outer prongs 162 and an inner latch, guide prong 164. Outer prongs 162 are spring members which may be squeezed inwardly towards each other for insertion within buckle sleeve 158. When thus inserted, prongs 162 spring outwardly to maintain a secure, friction engagement of insert tongue 160 within buckle sleeve 158.

A pair of rear belt loops 168 and 170 are provided on the rear side of waist belt 154 by stitching a belt loop segment 166 thereto. A second pair of belt loops 172 and 174 are provided on the front side of waist belt 154. Belt loop 172 is formed by stitching a loop strap 176 to the inside of waist belt 154 at the location shown in FIG. 5. The second front belt loop 174 is formed by passing one end 178 of belt 154 through the apertured end of buckle insert or tongue 160 and looping it back on itself through belt adjustment buckle 180. Adjustment buckle 180 is of the same conventional type as those shown at 150 and 152 on shoulder straps 146 and 148, and belt end 178 may be pulled therethrough to adjust belt 154 around the waist of the wearer.

Shoulder straps 146 and 148 preferably include lower, looped segments 146c and 148c which extend under the wearer's crotch and slip through slots in a crotch pad 182 as shown. With such a belt arrangement, the belt 102 takes the form of a body harness which is particularly well suited for securely engaging and supporting a child passenger.

Slidably supported and adjustably secured to the rear side of shoulder straps 146 and 148 are a pair of coupling members 184 and 186 having rearwardly projecting, slotted or sleeve type of buckle elements as shown. The coupling members 184 and 186 are sleeve type of buckle members identical to buckle 158 utilized on waist belt 154. Thus, the outer prongs 142 and 144 on coupling members 138 and 140 of the first belt 101 may be slidably received within coupling members 184 and 186 by squeezing them together. When so connected, complementary coupling members 138, 184 and 140, 186 are releasably coupled together in secure engagement.

As previously noted, FIG. 1 illustrates the use of harness 100 comprising cooperating belts 101 and 102 on an adult rider and a child passenger on a bicycle. Seat belt or harness 101 is worn by a bicycle rider, such as the adult shown in FIG. 1. The rider will be seated on the main bicycle seat 9. Belt 101 will be worn by him in the manner shown, with the rider's arms extending through looped shoulder straps 104 and 106. With belt 101 worn by the rider in such a manner, coupling members 138 and 140 will be disposed on the front side of the rider's torso. The second belt or harness 102 is worn by a passenger, such as the child shown in FIG. 1, sitting on the auxiliary seat 12. The passenger will be seated directly in front of the adult rider, as shown, in position for the passenger to grasp the handlebars 10 of the bicycle. With the child wearing harness 102 in the manner shown in FIG. 1, complementary coupling members 184 and 186 will be positioned on the rear side of the passenger, near the top of his shoulders. This construction and arrangement of the two pairs of coupling members on the belts 101 and 102 permits the convenient coupling of members 138, 184 and 140, 186 together at the location shown in FIG. 2. It will thus be seen that the passenger, such as a child, will be supported and held by the adult rider, by way of the detachable, coupling engagement of the harnesses 101 and 102 together.

The coupling members may readily be released or unbuckled simply by squeezing inwardly on prongs 142, 144 of coupling members 138 and 140 so as to pull those members out of the complementary coupling sleeves 184 and 186. The provision of neck strap 180 constructed and located so as to extend across the top of the shoulders of the rider, behind his neck, permits any weight load of the child through forces generated in riding a vehicle, to be comfortably borne by the rider wearing belt 101. Lower, looped segments 146c and 148c, shoulder straps 146 and 148 on the passenger, will extend under the torso and through the crotch of the passenger. Thus, belt 102 securely engages the body of the child passenger in a harness-like fashion.

With reference to FIG. 1 and in particular to FIGS. 2, 6 and 7, a footrest 200 as provided by the present invention will be described. As seen in the Figures, footrest 200 includes first and second sides 202 and 204 that meet at a vertex 206 to define an angle $\theta$ therebetween. Each side 202, 204 includes a pair of foot lands 203a, 203b and 205a, 205b respectively. The embodiment represented in the Figures includes two lands on each side, though more or less would be in accord with the present invention. Each land extends substantially the entire length of its respective side and is preferably disposed at an angle $\phi$ of about 135° with respect thereto. As best seen in FIG. 2, each land is preferably disposed at a right angle with respect to the vertical but at an angle of about 25° with respect to horizontal bar 2. The angle $\theta$ is preferably about 90°. Each of the angular measurements just mentioned may be within a range of $\pm 10°$. As shown in FIG. 2, the cross section of each foot land is at an angle of substantially 90° to the vertical axis A of the bicycle.

Each land may include means 207 for reducing slippage of the child's foot on the footrest. Such means for reducing slippage 207 may include an abrasive material that is adhered to the surfaces of the foot lands 203a, 203b and 205a, 205b. A means for cushioning 208 may be attached to the inner surface 210 of longitudinally extending vertex 206. Cushioning means 208 serves to reduce the transmission of road vibrations from the footrest to the child passenger and to protect diagonal bar 7 from scratching. Cushioning means 208 may be formed from rubber and may comprise a single piece extending the entire length of vertex 206 or may be a plurality of individual cushioning means attached thereto. Footrest 100 may be manufactured from a variety of materials, for example, a synthetic material or a metal such as aluminum. As shown in FIG. 2, footrest 200 has a width 211. Width 211 must be of sufficient extent so as to comfortably position the passenger's feet, but must not be so wide as to extend outwardly beyond the normal width of bicycle and passenger to present a hazard to persons and other obstacles which the bike may pass. While the width may vary, preferably at its widest point near the front of the footrest, the width should be in the range of about 16 inches. The minimum width should be that which allows a safe maneuvering of bicycle Because footrest 200 extends forwardly about front wheel 3a to provide the passenger with protection, footrest 200 presents a potential for interfering with the safe turning of the bicycle if the width is of insufficient extent. This minimum width will vary depending upon the bicycle upon which it is installed and the course followed by the bicycle rider.

As shown in FIG. 1, 2 and 6, footrest 200 is supported by diagonal bar 7, downwardly and forwardly of seat 12. When footrest 200 is properly attached, diagonal bar 7 nests within vertex 206. Footrest 200 is attached by means of front and rear straps 212 and 214. Thus front strap 212 is inserted through front slot 216 and front slot 217 and then wrapped around handlebar post 6. Similarly, rear strap 214 is inserted in rear slot 218 and rear slot 219 and then is wrapped around diagonal bar 7. To finish the attachment of each strap, its end is inserted within its respective clip 220 and then wrapped backwards upon itself and attached to itself using a hooks and loops means of attachment such a Velcro ® 221. In so attaching footrest 200 to bicycle 1, front strap 212 prevents footrest 200 from sliding downwardly on diagonal bar 7. Rear strap 214 functions to prevent footrest 200 from being raised off it's rest position against diagonal bar 7.

As best seen in side view FIG. 6, when footrest 200 is properly disposed on diagonal bar 7, sides 202 and 204 depend downwardly from and along either side of diagonal bar 7. The front portions 222 and 224 of first side 202 and second side 204 respectively, extend forwardly on opposite sides of front wheel 3. Thus, a child resting his feet on footrest 200 as shown in FIG. 1, is substantially prevented from accidentally inserting his feet into the spokes 3c of front wheel 3a, and consequently, the child's foot is protected form injurious contact with bicycle wheel 3a. In addition, both rider and passenger are protected from a potentially injurous spill of bicycle 1 by the entanglement of the child's foot within the spokes 3c of bicycle wheel 3a. As previously noted, the spilling of the bicycle with the accompanying passengers is potentially injurous not only to the child and the rider but to other bicycle riders and persons nearby at the time of the spill. Thus footrest 200 also serves to prevent injuries to bystanders whether they be riding another bicycle or simply in the vicinity of the falling bicycle. Finally, while an entanglement of a foot with spokes 3c may not always result in injury to the foot or a spill, damage to the spokes 3c could result. Thus, footrest 200 also prevents damage to the bicycle which might otherwise be caused by the fall of the bicycle as well as damage to spokes 3c by the child becoming entangled therein.

Thus, there has been disclosed and taught herein a bicycle passenger transportation system including a seat, footrest and supporting harness that will effectively enable the transportation of a passenger on a bicycle in a comfortable and safe manner. Each of the individual items of the present transportation system may be used individually or in various combinations with the others. Thus, for some passengers, especially those who are not young children, the seat and footrest may be used in combination without the harness.

It is anticipated that various changes may be made in the size, shape, and construction of the auxiliary seat, belt and footrest disclosed herein without departing from the spirit and scope of the invention as defined by the following claims.

What is claimed is:

1. A footrest usable by a person riding a bicycle having a frame, said frame including a horizontal tube, a handle bar post and a diagonal tube extending rearwardly and downwardly from said handle bar post, said footrest being supported at least by the diagonal tube of the bicycle, wherein said footrest comprises:
   first and second sides, each said side having a substantially planar side surface with a longitudinal direction of extent coextensive with that of the diagonal tube, said sides adjoining each other along adjacent ends thereof to form a longitudinally extending vertex and so as to define an included angle θ between said substantially planar side surfaces; and wherein each of said sides includes at least one foot land for resting a foot thereon, each said land comprising a substantially planar surface extending outwardly form and longitudinally rearwardly along each said respective planar side surface; and wherein said footrest is mounted to the diagonal bar such that the bar is nested within said longitudinally extending vertex and such that said sides depend downwardly from said vertex.

2. The footrest of claim 1 wherein each said foot land has an abrasive surface thereon.

3. The footrest of claim 1 and further including means for securing said footrest to the handle bar post of a bicycle at a location rearwardly thereof, with said vertex supported over the diagonal tube in coextensive engagement therewith.

4. The footrest of claim 1 and including means for attachment of said foot rest to a bicycle, wherein said attachment means comprises:
a pair of apertures disposed on opposite sides of said footrest in both front and rear portions thereof; and
a pair of straps, one strap insertable into a pair of said apertures in said front portion of said footrest and adapted to be wrapped around said handle bar post and the other strap insertable into said rear pair of apertures and adapted to be wrapped around said diagonal bar.

5. The footrest of claim 1 wherein the angle θ is the range of between 80° and 100°.

6. The footrest of claim 1 wherein each foot land extends longitudinally along its respective side at an angle of about 135° thereto.

7. The footrest of claim 6 wherein each said foot land is disposed at an angle of about 25° with respect to said longitudinally extending vertex.

8. The footrest of claim 1 wherein said bicycle has a vertical axis and the cross-section of each said foot land in a vertical plane is disposed at an angle of about 90° with respect to the vertical axis of the bicycle when said footrest is attached to said bicycle.

9. The footrest of claim 1 wherein said footrest is made of aluminum.

10. The footrest of claim 1 wherein said footrest is made of a synthetic material.

11. The footrest of claim 1 wherein said vertex extends at an angle with respect to said foot lands, permitting said vertex to conform to the angular disposition of the bicycle diagonal tube in mounting engagement therewith.

12. The footrest of claim 1 wherein said sides depend downwardly form said vertex at such an angular disposition as to support said foot lands at a location where the feet of a passenger resting thereon cannot come into contact with the spokes of the front wheel of the bicycle.

13. A bicycle passenger transportation system for a bicycle having a frame including a horizontal tube, a handle bar post, and a diagonal tube extending rearwardly and downwardly therefrom, said system comprising:
a footrest usable by a passenger riding the bicycle, said footrest being supported at least by the diagonal tube of the bicycle, wherein said footrest includes:
first and second sides, each side having a substantially planar side surface with a longitudinal direction of extent coextensive with that of said diagonal tube, said sides adjoining each other along adjacent ends thereof to form a longitudinally extending vertex and so as to define an included angle θ between said planar side surfaces, said footrest being mounted to said diagonal bar such that said diagonal bar is nested within said longitudinally extending vertex and such that said sides depend downwardly from said vertex; and wherein each of said sides includes at least one foot land for resting a foot thereon, each said land comprising a substantially planar surface extending outwardly from and longitudinally rearwardly along each said respective planar side surface; and wherein said system further comprises an auxiliary seat for attachment to the horizontal bar forwardly of the main seat.

14. The system of claim 13 wherein said auxiliary seat comprises:
an elongated seat cushion formed from material of sufficiently high density to support the weight of a person;
an elongated slot extending over the entire length of said seat cushion and terminating at its lower end in a continuous opening in the bottom of said seat cushion extending through the outer surface thereof, and the upper end of said slot being closed and terminating within the body of said seat cushion, whereby said seat cushion may be removably mounted on the horizontal bar extending between the main seat post and the handle bar post of a bicycle, at a location forwardly of the main seat on said seat post, by placing said continuous opening against the top of said horizontal bar and forcing the seat cushion downwardly so that said slot slides over said horizontal bar, until said closed end of said slot is brought into firm engagement with said horizontal bar.

15. The bicycle passenger transportation system as defined in claim 14 wherein said slot terminates at its upper end in a tubular passage sized and adapted to fit snugly around the aforesaid horizontal bar of a bicycle, and said cushion having sufficient resiliency that the material of said cushion defining said tubular passage will spring back around the horizontal bar in secure, embracing engagement therewith after said slot is forced over the bar.

16. The bicycle passenger transportation system as defined in claim 14 wherein said slot extends substantially vertically when said seat cushion is oriented generally horizontally for mounting on a horizontal bar of a bicycle, and said tubular passage is located substantially at the longitudinal central axis of said seat cushion.

17. The bicycle passenger transportation system as defined in claim 14 wherein said slot extends substantially vertically within said seat cushion, when said seat cushion is oriented generally horizontally for mounting on a horizontal bar of a bicycle, said slot extending between said continuous opening at its lower end and said closed upper end thereof.

18. The bicycle passenger transportation system as defined in claim 14 wherein said tubular passage at the upper end of said slot is of a lesser diameter than the horizontal bicycle bar which it is adapted to embrace, whereby the walls of said tubular passage squeeze around the horizontal bar and tightly embrace it after the installation of said seat on such a bicycle bar.

19. The bicycle passenger transportation system as defined in claim 14 wherein the material from which said seat cushion is formed is polyurethane.

20. The bicycle passenger transportation system as defined in claim 14 wherein said cushion is of cylindrical shape.

21. The bicycle passenger transportation system as defined in claim 20 wherein said seat cushion is in the shape of a right circular cylinder, and is uniformly of such a shape over its entire length, whereby a person seated thereon will be comfortably supported at any position along the length of the seat cushion where the person must position himself in order to grip the handlebars on a bicycle.

22. The bicycle passenger transportation system as defined in claim 14, and further including:
a protective and decorative cover wrapped around the outside of said seat cushion and extending into and covering the portions of said seat cushion defining said slot and said closed upper end thereof so as to protect said portions of said cushion from wear in the course of sliding said slot onto and off of a horizontal bar of a bicycle for installation and removal of said seat cushion.

23. The bicycle passenger transportation system as defined in claim 22 wherein said cover has a pocket formed integrally therewith, said pocket depending downwardly from said seat cushion when said seat cushion is installed in its normal position of use.

24. The bicycle passenger transportation system as defined in claim 23 wherein said cover is made of nylon.

25. The bicycle passenger transportation system of claim 13 wherein each said foot land has an abrasive surface thereon.

26. The bicycle passenger transportation system of claim 13 and further including means for securing said footrest to the handle bar post of a bicycle at a location rearwardly thereof, with said vertex supported over the diagonal tube in coextensive engagement therewith.

27. The bicycle passenger transportation system of claim 13 and including means for attachment of said foot rest to a bicycle, wherein said attachment means comprises:
a pair of apertures disposed on opposite sides of said footrest in both front and rear portions thereof; and
a pair of straps, one strap insertable into a pair of said apertures in said front portion of said footrest for wrapping around said handle bar post and the other strap insertable into said rear pair of apertures for wrapping around said diagonal bar.

28. The bicycle passenger transportation system of claim 13 and further including:
a first belt adapted to be worn by a rider on said main seat, said first belt having coupling means located thereon so as to project forwardly from the front of the rider's body; and
a second, belt adapted to be worn by a passenger sitting on said auxiliary seat in front of said main seat, said second belt having complementary coupling means located thereon so as to project rearwardly from the back side of the passenger's body for detachable, coupling engagement with said coupling means on said first belt, whereby a passenger sitting on said auxiliary seat will be secured to and supported by a rider sitting on said main seat.

29. The passenger, transportation belt system as defined in claim 28 wherein said first belt comprises a pair of opposed, looped shoulder straps through which the rider's arms extend and which are adapted to fit around the rider's shoulders, and said coupling means comprising a pair of coupling members secured to said shoulder straps and extending forwardly therefrom, said coupling members being constructed and arranged to releasably connect to said complementary couplinq means in detachable, coupling engagement therewith.

30. The passenger transportation system as defined in claim 29 wherein said first belt further comprises a neck strap connected between the top of said looped shoulder straps and adapted to lie across and bear against the top of the shoulders of the rider.

31. The bicycle passenger transportation system as defined in claim 29 wherein said second belt has first and second shoulder straps adapted to be secured over the tops of the shoulders of the passenger, and said complementary coupling means comprises first and second coupling members attached to said shoulder straps and constructed to releasably couple to said pair of coupling members on said first belt.

32. The bicycle transportation system of claim 13 wherein
said vertex extends at an angle with respect to said foot lands, permitting said vertex to conform to the angular disposition of the bicycle diagonal tube in mounting engagement therewith.

33. The bicycle transportation system of claim 13 wherein said sides depend downwardly from said vertex at such an angular disposition as to support said foots lands at a location where the feet of a passenger resting thereon cannot come into contact with the spokes of the front wheel of the bicycle.

34. A footrest usable by a person riding a bicycle having a frame, said frame including a horizontal tube, a handle bar post and a diagonal tube extending rearwardly and downwardly from said handle bar post, said footrest being supported at least by the diagonal tube of the bicycle, wherein said footrest comprises:
first and second sides connected to each other to define an included angle $\theta$ therebetween; and
attachment means for attaching said footrest to the handle bar post of a bicycle, said attachment means comprising:
a pair of apertures disposed on opposite sides of said footrest in both front and rear portions thereof; and
a pair of straps, one strap insertable into a pair of said apertures in said front portion of said footrest and adapted to be wrapped around said handle bar post and the other strap insertable into said rear pair of apertures and adapted to be wrapped around said diagonal bar;
wherein each of said sides includes at least one foot land for resting a foot, each said land comprising a substantially planar surface extending outwardly form each said respective side 35. A bicycle passenger transportation system for a bicycle having a frame including a horizontal tube, a handle bar post, and a diagonal tube extending rearwardly and downwardly from said handle bar post, said system comprising:
an auxiliary seat for attachment to the horizontal bar forwardly of the main seat for supporting a passenger thereon; and a footrest usable by a passenger riding the bicycle, said footrest being supported at least by the diagonal tube of the bicycle, wherein said footrest includes:

first and second sides connected to each other to define an included angle $\theta$ therebetween; and attachment means for attaching said footrest to the handle bar post of a bicycle, said attachment means comprising:

a pair of apertures disposed on opposite sides of said footrest in both front and rear portions thereof; and a pair of straps insertable into a pair of said apertures in said front portion of said footrest and adapted to be wrapped around said handle bar post and the other strap insertable into said rear pair of apertures and adapted to be wrapped around said diagonal bar;

wherein each of said sides includes at least one foot land for resting a foot thereon, each said land comprising a substantially planar surface extending outwardly from each said respective side.

* * * * *

UNITED STATES PATENT AND TRADEMARK OFFICE
CERTIFICATE OF CORRECTION

PATENT NO. : 5,190,306
DATED : 3/2/93
INVENTOR(S) : Leonard G. Nauman and Dale E. Stenberg It is certified that error appears in the above-indentified patent and that said Letters Patent is hereby corrected as shown below:

In Col. 3, line 24, delete "ba" and substitute --bar-- therefor.

In Col. 5, line 36, after the word "mounting" delete the letter "o" and substitute --on-- therefor.

In Col. 6, line 68, delete "th" and substitute --the-- therefor.

In claim 12, col. 11, line 55, delete "form" and substitute --from-- therefor.

Signed and Sealed this

Thirtieth Day of August, 1994

Attest:

BRUCE LEHMAN

Attesting Officer

Commissioner of Patents and Trademarks